United States Patent [19]

Dionne

[11] Patent Number: 4,879,963
[45] Date of Patent: Nov. 14, 1989

[54] FISHING SEAT
[75] Inventor: Roland A. Dionne, Warwick, R.I.
[73] Assignee: Robert N. Beliveau, Warwick, R.I.
[21] Appl. No.: 294,310
[22] Filed: Jan. 9, 1989

Related U.S. Application Data

[63] Continuation-in-part of Ser. No. 160,760, Feb. 26, 1988, abandoned.

[51] Int. Cl.$^4$ .............................................. B63B 29/00
[52] U.S. Cl. .................................... 114/363; 297/188; 43/21.2
[58] Field of Search ...................... 114/343, 363, 255; 297/188; 248/514, 540; 43/21.2

[56] References Cited

U.S. PATENT DOCUMENTS

| | | | |
|---|---|---|---|
| 1,406,571 | 2/1922 | McCoy | 297/188 |
| 2,375,696 | 5/1945 | Shick | 297/188 |
| 3,126,180 | 3/1964 | Mandolare | 248/514 |
| 3,359,928 | 12/1967 | Gamble | 248/514 |
| 3,623,766 | 11/1971 | Funk | 297/188 |
| 3,851,916 | 12/1974 | Quartullo | 114/363 |
| 4,086,676 | 5/1978 | Arruza | 114/363 |
| 4,278,289 | 7/1981 | Esposito | 114/363 |
| 4,682,438 | 7/1987 | Aarow | 43/21.2 |

Primary Examiner—Sherman D. Basinger
Assistant Examiner—Stephen P. Avila
Attorney, Agent, or Firm—Barlow & Barlow

[57] ABSTRACT

A sport fishing seat for fishing boats is provided with a saddle seat and a foot pedal assembly. In one version the foot pedal assembly pivots of the seat support which enables a fisherman to utilize the leg muscles while reeling in a game fish. The foot pedal assembly in that version includes a tubular post which receives the butt end of the fishing rod while at the lower end thereof the pedal portion may be engaged by the feet of the fisherman. This assembly is pivotally mounted on a bracket means extending laterally outward from underneath the seat proper and this enables the fisherman to utilize his leg muscles to greater advantage in playing and landing a game fish. In all saddle seat versions the fisherman has his legs on either side of the saddle seat and is a convenient arrangement for small boats, little space being taken up by the seat and pedestal.

6 Claims, 2 Drawing Sheets

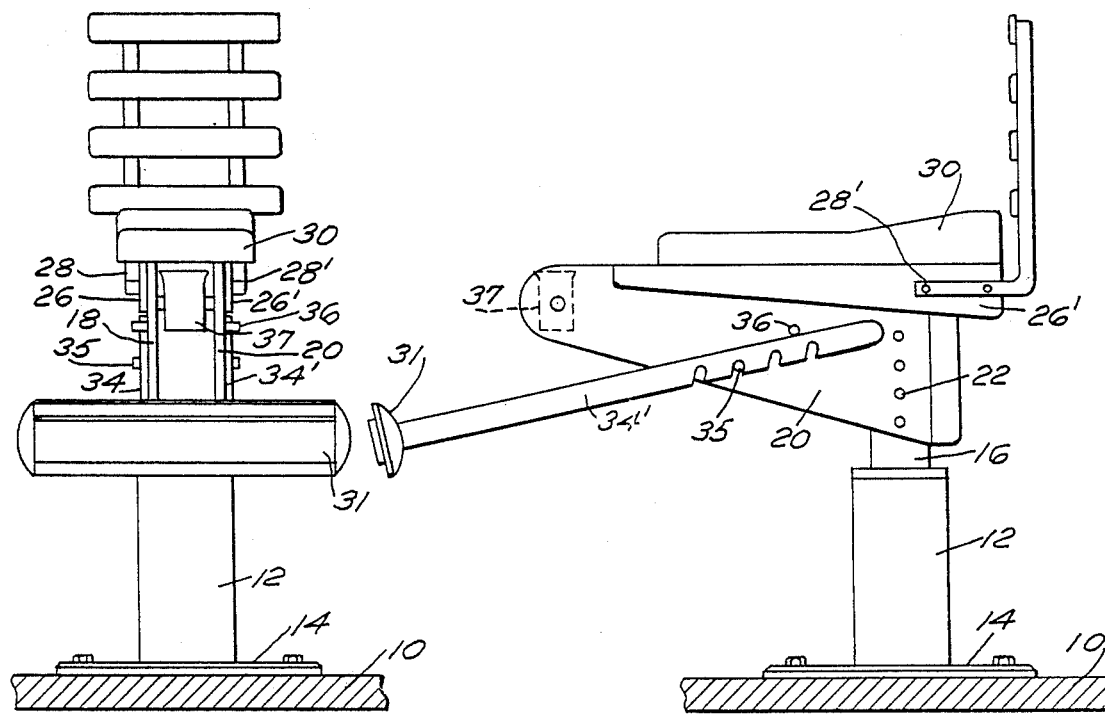
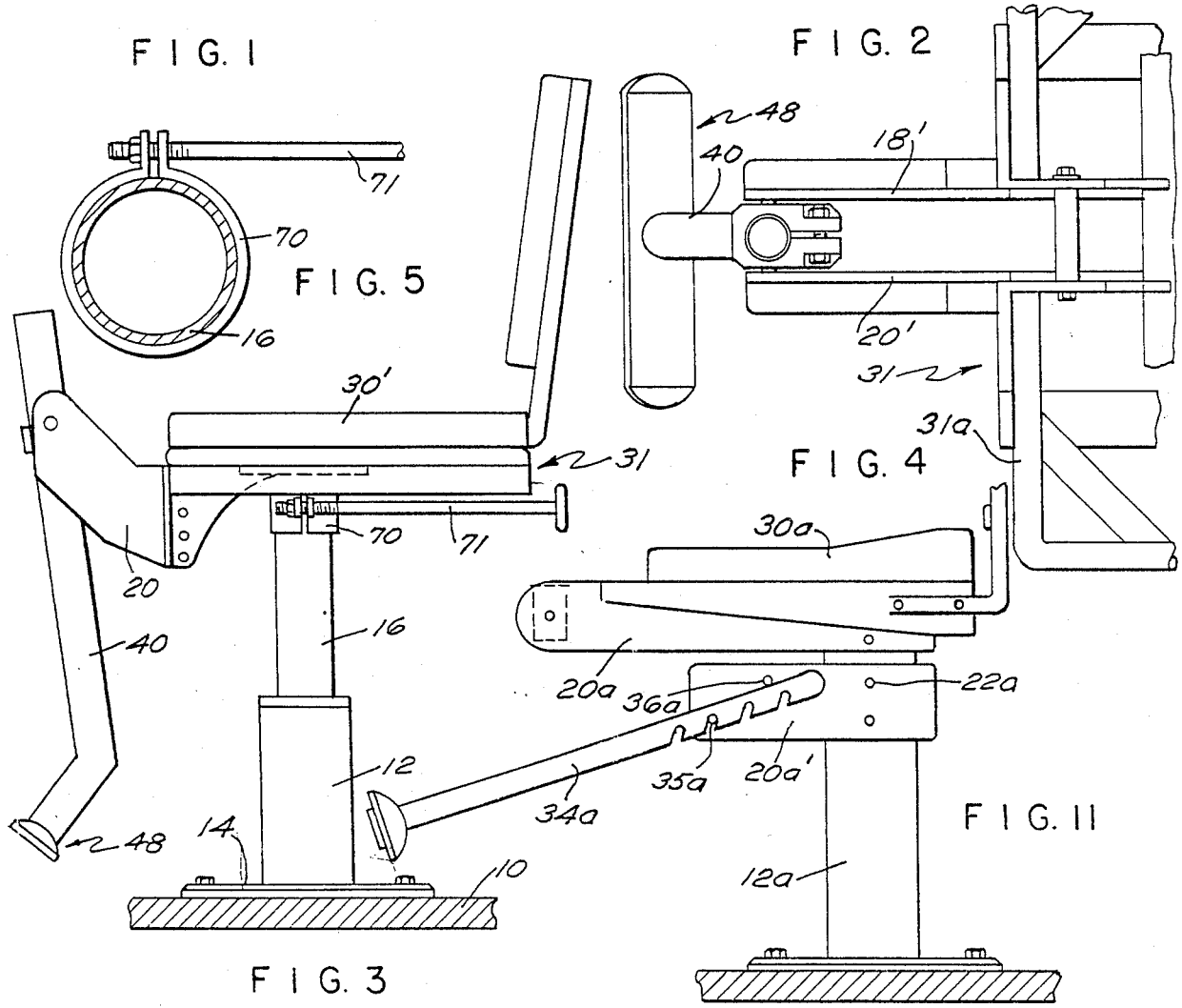

FISHING SEAT

CROSS-REFERENCE TO RELATED APPLICAITONS

This application is a continuation-in-part of my application, Ser. No. 07/160,760, filed Feb. 26, 1988 now abandoned.

BACKGROUND OF THE INVENTION

In fishing for game fish such as marlin, sailfish and the like, it is customary for the sport fisherman to sit in a fishing chair mounted on the boat. A conventional fishing chair which is illustrated by the Esposito, patent U.S. Pat. No. 4,278,289, has an upstanding back rest and a seat which pivot about a pedestal that is mounted on the boat deck. From the underside of the seat there generally extends outwardly a footrest so that the fisherman may brace himself while landing a fish while at the front edge of the seat, a rod holder is pivotally mounted so that the butt end of the fishing rod may be received therein. All known seats are conventional full buttocks pads generally with back rests and some are provided with arm rests. The rod holder is designed to be pivoted at least about a horizontal axis so that the fisherman may work the rod back and forth while reeling in a fish, sometimes known as pumping the rod. As might be imagined, to land a game fish is a strenuous and time consuming job and depending upon the size of the fish, it is not uncommon for someone to spend upwards of four hours in landing a fish. In utilizing the conventional arrangement, the fisherman employes his arms, shoulders and back muscles to pivot the rod from let us say approximately a 45 degree attitude to an upright position in order to reel the fish in slowly. Thus, in operation, the rod will be pulled back towards the fisherman and then rapidly let downwardly while the line is reeled in as fast as possible. This is a very fatiguing operation. In the prior art there have been some suggestions to alleviate the exhausting operation as for example, in the Quartullo U.S. Pat. No., 3,851,916. In this disclosure a fishing chair is arranged in such a way that the seat slides back and forth while the fisherman uses his leg muscles rather than his arm muscles. Of a similar nature is a disclosure in the Arruza U.S. Pat. No. 4,086,676. There is also in the prior art a pole holder which may be rocked from normal trolling position into an upright position in order to set the hook. Such an arrangement is seen in the Mandolare U.S. Pat. No. 3,126,180.

For small boats the usual fishing chair is an extremely bulky object and is not suited to 25 foot boats. While small seat have been seen in patents such as Funk, U.S. Pat. No. 3,623,766, this type of arrangement is not suitable for game fishing. While Arrow U.S. Pat. No. 4,682,438 discloses a conventional seat mounted in a small boat for offshore fishing, there is no disclosure of a long, narrow saddle seat that takes up little space and is very comfortable.

SUMMARY OF THE INVENTION

A sport fishing seat is provided which seat in one form of the invention is a saddle and in all forms is supported by a pedestal that can be fastened to the deck of a boat. A bracket extends laterally out from the pedestal underneath the seat. In one form of the invention, the foot rest is supported from the pedestal and in another form of the invention at the end of a bracket extending outwardly from the pedestal there is journally received therein a foot rest assembly that includes an arm. At one end of the arm are foot pedals while at the opposite end on the other side of the journal there is located a pole socket to receive the butt end of a fishing pole. The above described arrangement may be made part of an existing fishing chair by removing the foot rest or may be made as an integral unit in which a seat is mounted on top of the bracket and pedestal. With the fishing pole received in the socket, the pole may be rocked from a position, let us say substantially at 45 degrees to the horizontal to an upright position, the fisherman utilizing his feet on the pedal bracket that is at the end of the footpedal arm. The result of this type of construction is that all of the forces that are utilized in so called pumping the pole will be those used by the leg muscles so that greater endurance may be achieved. Other forms of the invention utilize the concept of a single post foot rest with a foot plate and a saddle or conventional seat, the butt holder being separate from the foot rest for tournament fishing.

It is therefore the principal object of the present invention to provide a sport fishing seat which has a saddle structure that allows the seat to be used on small boats and in one form to allow a fisherman to utilize his leg muscles to greater advantage while landing a game fish or the like.

DESCRIPTION OF THE DRAWINGS

FIG. 1 is a front elevational view of a saddle seat fishing chair made in accordance with the invention;

FIG. 2 is a side elevational view thereof;

FIG. 3 is a side elevational view of a second form of the invention on a conventional seat;

FIG. 4 is a partial top view thereof with the seat cushion removed;

FIG. 5 is a view of the pedestal seat clamp;

FIG. 11 is a partial side elevational view of a modified construction similar to FIGS. 1 and 2.

DESCRIPTION OF THE PREFERRED EMBODIMENTS

Figure 6:
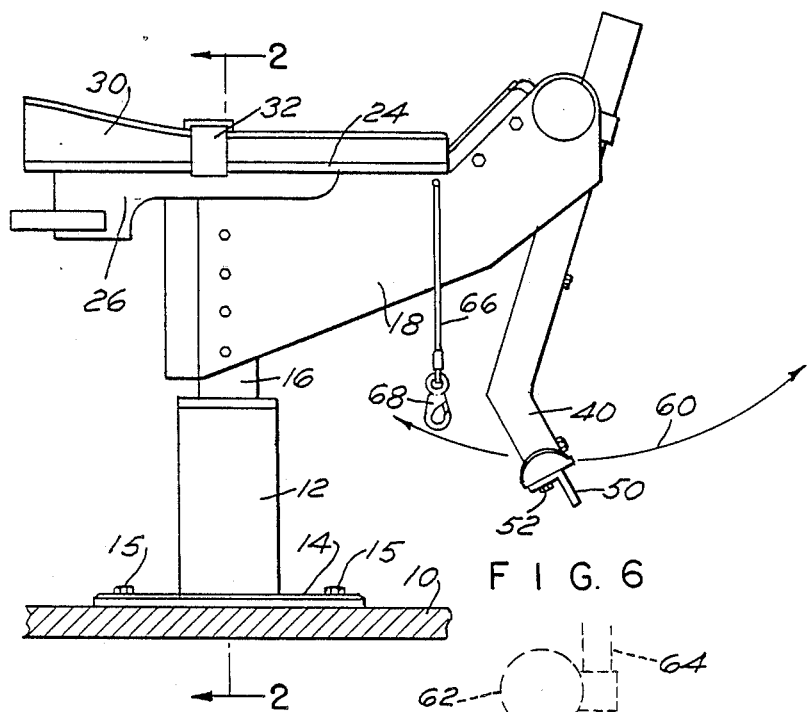
FIG. 6 is a side elevational view of a sport fishing seat constructed in accordance with a third form of the invention.
Figure 7:
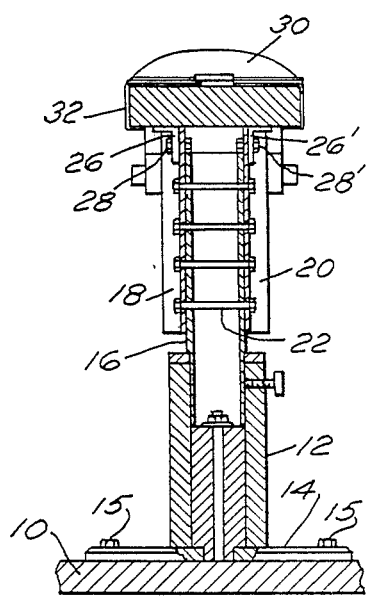
FIG. 7 is a front view thereof.

As seen in the drawings, the sport fishing seat including its appendages is mounted on a deck 10 and includes a supporting column 12 having a base flange 14, the latter of which is fastened to the deck by means of bolts or some other suitable fastening elements. Received within the supporting column is a post 16 and on top of the post there is received a pair of bracket plates 18, 20, which are fastened to the post by a plurality of thru bolts such as 22, see FIGS. 2 and 7. The seat proper has a bottom plate 4 with a pair of depending webs 26, 26', which webs are fastened to the bracket plates 18, 20 by bolts 28, 28'. For convenience sake, mounted upon the seat plate 24, is a saddle seat cushion 30 with an upper top and side walls and passing through the depending webs 26, 26', is a seatbelt 32 seen best in FIG. 6.

The arrangement illustrated in FIGS. 1, 2, 6, 7 and 11 allows the fisherman to essentially straddle the bracket plates 18, 20, 20a and 20a'. In FIGS. 1 and 2 a seat that complies with tournament rules has the plates 18 and 20 mounting a foot rest 31 that has a pair of struts 34, 34' adjustable pinned by pins 35, 36. A gimbal or rod butt holder 37 is mounted to pivot between the plates 18, 20. A conventional harness is used to connect the fisherman through the harness to his reel. In the form illustrated in FIG. 11, the similar seat is supported on one set of bracket plates or other seat support means 20a while the foot rest is supported on a pair of plates 20a' that are mounted upon the pedestal or support column means 12a. In all other respects the arrangement of FIG. 11 is identical to the FIG. 1 and 2 embodiments and like parts bear the same reference numerals with the letter a.

In the alternate embodiment of FIGS. 3-10, at the outer end of the bracket plates 18 and 20, there is received for pivoting action a foot rest assembly. The foot rest assembly, as seen more particularly in detail in FIGS. 7, 8 and 9, consists of a tubular post 40 and about the tubular post is a clamp made up of two halves 42, 42', which have a shaft 43 passing therethrough so that two tub ends thereof are journally received as at 44, 44', in the bracket plates 18, 20. To protect the journal, coverplates 46, 46' re provided over the area.

Figure 8:
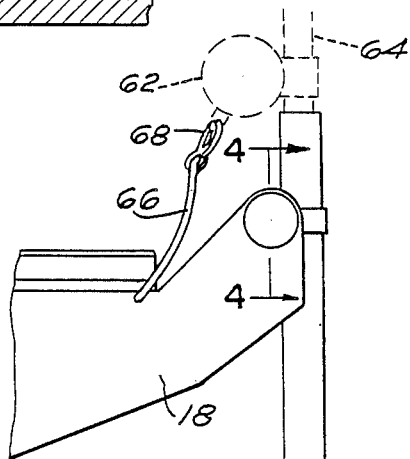
FIG. 8 is a view of the bracket with the foot pedal assembly having received a rod and reel therein.
Figure 9:
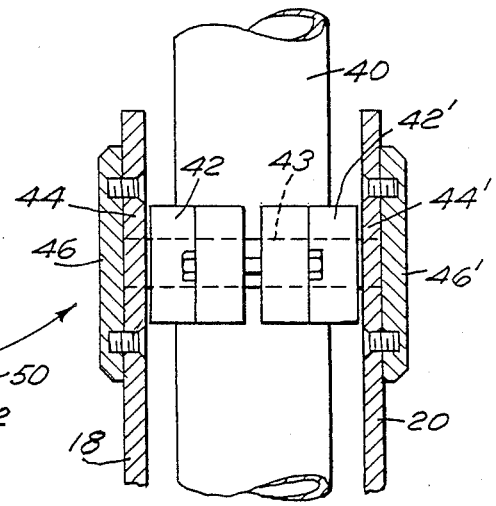
FIG. 9 is a view taken on lines 4—4 of FIG. 7.
Figure 10:
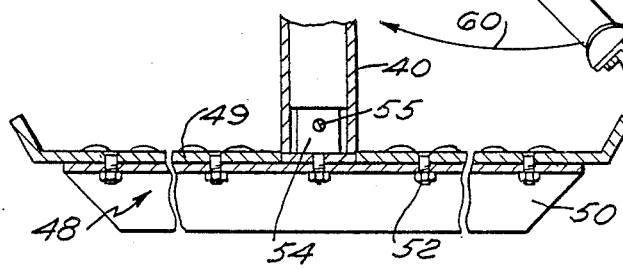
FIG. 10 is a front view of the foot pedal assembly at the lower end thereof.

At the lower end of the tubular post 40 there is received he foot engaging pedal, generally designated 48, which consists essentially of a tread plate 49, 49' and an L-shaped stiffening plate 50 which are fastened together by bolts such as 52 or other suitable fastening means as by spot welding. This assembly is suitably held in the end of the tubular post 40 with a stub shaft 54 that is inserted within the end of the post 40 and pinned therein as by a pin 55. As seen in FIG. 8, this entire foot rest assembly, which includes a tubular post 40, is adapted to rock to and fro as seen by the arrows 60. Also as seen in FIG. 8, in broken lines is a reel 62 of a fishing pole 64 which is inserted in the open upper end of the tubular post 40. To prevent the fishing pole from being lost or dislodged, a safety cable 66 is provided with a snap hook 68 that will engage the usual eye on a fishing reel.

In the embodiment of FIGS. 3, 4 and 5, the conversion of an existing seat is illustrated and the plates 18', 20' are connected to a conventional seat frame, generally indicated 31, which consists of a peripheral frame 31a interconnected by transverse braces. It is to this structure that the plates are suitably welded. In as much as the seat frame 31 generally is mounted on a post, the attachment of the seat structure thereto may be through a clamp 70 having a threaded clamping rod 71. Upon the seat frame a cushion 30' is suitably fastened and a backrest as illustrated may be provided. The remaining structure is identical to the FIG. 6 arrangement.

It will be appreciated that the arrangement disclosed in FIGS. 3-10 permit the fisherman seated on the seat to place his feet on the foot pedal and rock the tubular post or arm to and fro. This then utilizes the leg muscles to pump the pole. By way of illustration, let us assume for the moment that a fish strikes which then bends the pole to the right as seen in FIG. 1. and 3 in the drawings. At this point, in order to set the hook, the fisherman will exert a force with his legs to rock the foot pedal assembly in a counterclockwise direction as seen in FIGS. 1. and 3. This type of action can be continued and repeated for any number of times by pumping the rod in order to reel in the line and gain further control of the fish which is a repeated motion of letting the rod move forward quickly and reeling in the line and then pumping the rod back to a vertical. Thus, instead of using the arms and back muscles to pump and hold the fish, the fisherman uses his heavier leg muscles.

I claim:

1. A sport fishing seat comprising a pedestal adapted for mounting on the decking stucture of a boat, a long and narrow saddle seat having a cushioned upper surface defining a seat platform and side walls, means supporting the saddle seat from the pedestal, a foot rest assembly supported by said pedestal and having foot pedal tread plates extending laterally outward from one end thereof remote from the pedestal and a butt holder for a fishing pole mounted on said seat platform, said seat platform having a narrow width whereby a fisherman's legs closely straddle the said side walls of the seat.

2. A sport fishing seat as in claim 1 wherein the means supporting the saddle seat and the butt holder comprises a pair of racket plates fastened to opposite sides of the pedestal.

3. A sport fishing seat assembly supported on an adjustable pedestal comprising a pair of bracket plates fastened to opposite ides of the pedestal, a long and narrow saddle seat having a cushioned upper surface defining a seat platform fastened to the upper edge of the plates, a foot rest assembly comprising a post pivotally secured between the said bracket plates and supported by said plates and having foot pedal plates extending laterally outward from one end thereof remote from the bracket plates and a butt holder for a fishing pole at the upper end of said post said seat platform having a width substantially equal to the spacing of the bracket plates whereby a fisherman's legs straddle the bracket plates.

4. A sport fishing seat defined by a front, side and rear edges, a pedestal, said seat having support means therefore comprising a bracket fixedly attached to the pedestal and extending laterally beyond the front edge of the seat, a foot rest assembly including a post means extending therefrom pivotally mounted on said bracket for rocking movement, one end of the post having a foot pedal, the other end of the post remote from the foot pedal having a pole socket, rocking movement of the foot rest assembly causing a fishing rod received in the socket to be rocked whereby the leg muscles of the fisherman will be used to pump the fishing pole.

5. A sport fishing seat as in claim 4 wherein the bracket comprises a pair of spaced plates and the foot rest assembly is pivoted between the spaced plates.

6. A sport fishing seat as in claim 4 wherein the foot pedal extends on either side of the post means to permit engagement by both feet.

* * * * *